J. G. HARVEY.
GAS STOVE.
APPLICATION FILED JUNE 14, 1909.

992,660.

Patented May 16, 1911.

2 SHEETS—SHEET 1.

Witnesses
W. A. Williams
S. L. Burket

Inventor
John G. Harvey
By A. S. Pattison
Attorney

J. G. HARVEY.
GAS STOVE.
APPLICATION FILED JUNE 14, 1909.
992,660.
Patented May 16, 1911.
2 SHEETS—SHEET 2.
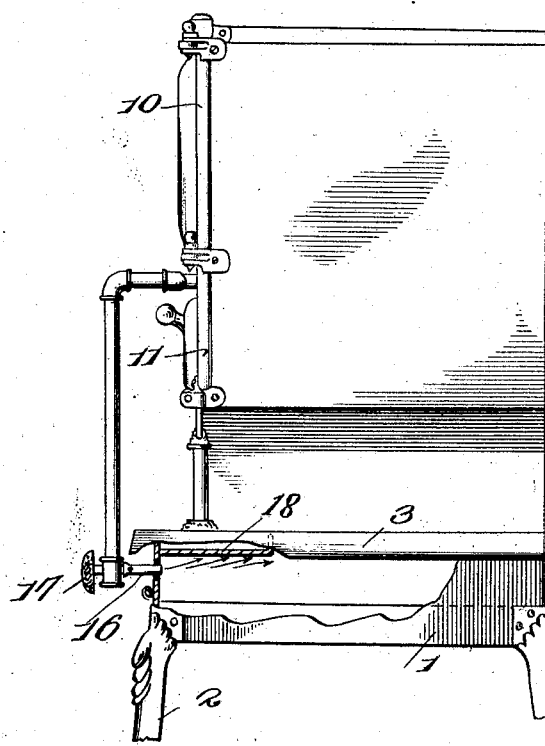
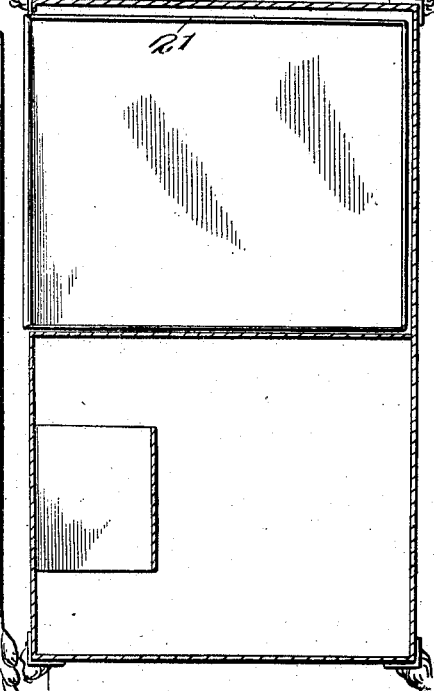
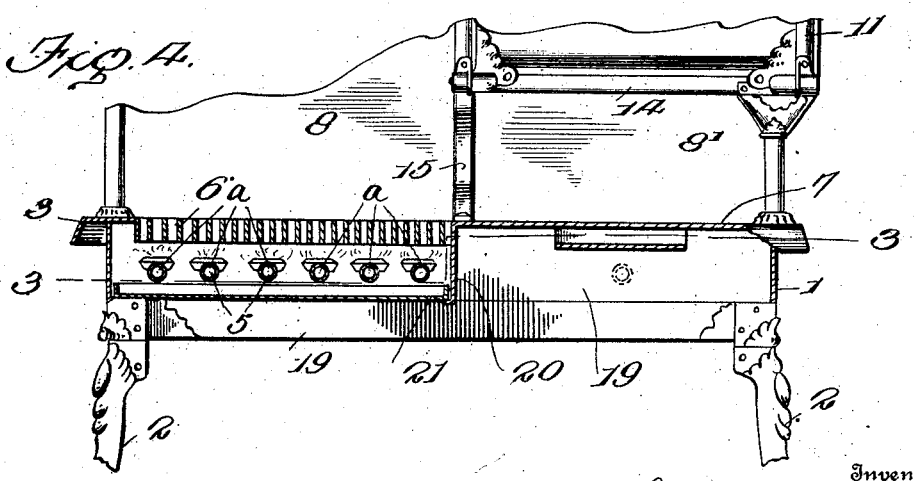

UNITED STATES PATENT OFFICE.

JOHN GRIFFITH HARVEY, OF CHICAGO, ILLINOIS, ASSIGNOR TO AMERICAN STOVE COMPANY, OF ST. LOUIS, MISSOURI, A CORPORATION OF NEW JERSEY.

GAS-STOVE.

992,660.  Specification of Letters Patent.  Patented May 16, 1911.

Application filed June 14, 1909. Serial No. 502,064.

*To all whom it may concern:*

Be it known that I, JOHN G. HARVEY, citizen of the United States, residing at Chicago, in the county of Cook and State of Illinois, have invented certain new and useful Improvements in Gas-Stoves, of which the following is a specification, reference being had therein to the accompanying drawing.

This invention relates to improvements in gas stoves, and is of that type in which there are open burners combined with baking and broiling ovens.

The object of the present invention is to so locate and arrange the ovens in respect to the top and open burners, as to obviate certain objections to this type of stove as heretofore constructed, and to at the same time have one end of the top provide a warming shelf below and separated from the ovens, all of which will be fully set forth hereinafter.

In the accompanying drawings—Figure 1 is a perspective view of a gas stove which embodies the present invention. Fig. 2 is an end view, partly in section through the warming shelf. Fig. 3 is a horizontal section on the line 3—3 of Fig. 4. Fig. 4 is a longitudinal vertical section on the line 4—4 of Fig. 1.

In carrying out the present invention, a main horizontal frame 1 is provided, and this frame has suitable supporting legs 2. The top 3 is provided at one end with an opening 4, below which the desired number of open burners $a$ are placed, and these burners are controlled by the valves 5, and the usual grating 6 is placed in the opening 4. The opposite end 7 of this top constitutes a warming shelf for the purpose to be explained hereinafter.

A back 8 is located at the rear edge of the top 3 and extends upward therefrom the usual distance, and is here shown with the usual shelf 9 at its top.

Particular attention is directed to the location of the baking oven 10 and broiling oven 11, in that they are located above but apart from the warming shelf 7 of the top 3. This arrangement provides a space or compartment 12 having a rear wall 8', an outer wall 13, a top 14 formed by the bottom of the broiling oven 11, and a bottom formed by the warming shelf 7. This arrangement forms a space below the ovens having at its bottom the warming shelf 7 to receive dishes or cooking utensils, and a small Bunsen burner 16 is located to direct its flame below the warming shelf 7 for warming the shelf, and the shelf in turn warming and keeping warm dishes, food or cooking utensils placed thereon, and also warming the space or compartment 12 between the warming shelf 7 and the ovens. This space or compartment is also warmed by heat radiation from the open burners.

The burner 16 is controlled by a suitable valve 17 at the front of but in a plane below the warming shelf 7, and a flame deflector plate 18 is placed between the flame from the burner 16 and the warming shelf 7 to prevent excessive heating of the shelf at one point and thereby warping the shelf and perhaps by its excessive heat cracking or breaking dishes placed thereon. By means of this deflector plate 18 the heat from the small burner is evenly diffused under the warming shelf, and gently and uniformly heats it throughout. A wall 19 depends from the edge of the top, and this wall or apron, together with the inner end 20 of the burner box 21 for the open burners $a$, provides a pocket below the warming shelf in which the heat from the small burner 16 is pocketed and retained for uniformly heating the warming shelf. Furthermore, the compartment 12 above the warming shelf pockets and retains the gentle heat radiating from the shelf, and also the heat laterally radiating from the open burners, thus serving to assist in uniformly warming the dishes or utensils thereon.

Attention is especially directed to the fact that the broiling oven 11 is preferably below the top of the back 8, and this makes the compartment 12 of such size as to enable the gentle heat to keep the air therein substantially at a uniform temperature.

So far as known gas stoves having open burners combined with baking and broiling ovens, have been of three types.

First: That type in which the ovens are directly above the open burners. In this arrangement, it has been necessary to place the oven sufficiently high to get the ovens above the effective cooking heat of the open burners, and have the bottom of the lowest oven substantially in the horizontal plane of the top of the back 8. This construction has two objectionable features: (*a*) It is dangerous, by reason of the liability of the flame and heat from the open burners setting fire to the sleeve of the cook when using the ovens above the burners, and (b) to avoid this danger and to allow sufficient space the ovens are so elevated as to be inconvenient for persons of the average height.

Second: That type in which the ovens are placed at the side of the top or open burners, with the lowest oven either in the horizontal plane of the open burners, or below such plane. This type avoids the danger referred to in respect to the first type, but it occupies more horizontal space, and places the burners for the ovens so low that the operator must stoop to examine them for adjustment of the flame, and to determine whether the burners are properly operating.

Third: That type in which the ovens are placed in a vertical plane below the open burners. This type also avoids the dangerous feature of the first type, but it places both ovens and flame so low that the cook must stoop for all cooking operations in connection with the ovens, or the burners.

By the novel arrangement here shown and described, all of these objections are cured, and at the same time a warming shelf is provided upon which dishes and utensils may be warmed, and it supplies a want recognized for years, and for years sought after by the public and manufacturers. By this arrangement the open burners and the ovens can be simultaneously used without the danger mentioned; the ovens and the open burners are at convenient heights; dishes and food can be kept warm by the warming shelf within the space 12; the ovens provide a cover protection for the dishes and food, and a top for the space 12, thereby serving to retain the heat therebelow.

Having thus described my invention, what I claim and desire to secure by Letters Patent is:

1. In a gas stove, the combination with a top having one end portion provided with burner openings and burners thereunder and the other end portion forming a warming shelf, of an oven above and near the warming shelf, the inner end of the oven beginning substantially in a line above the inner end of the warming shelf and extending outward above the warming shelf, and a warming means below the warming shelf, whereby the space between the oven and the warming shelf may be warmed by heat radiation from the warming shelf, and access to the oven may be had without danger from the open burners.

2. In a gas stove, the combination with a top having one end portion provided with burner openings and burners thereunder, and the other end portion forming a warming shelf, of an oven above and near the warming shelf for the purpose described, the inner end of the oven beginning substantially in a line above the inner end of the warming shelf and extending outward above the warming shelf, a transversely arranged vertical end wall at the outer end of the warming shelf and connecting it with the bottom of the oven, and means for warming the shelf, whereby the space between the oven and the warming shelf may be warmed by heat radiation from the burners and access may be had to the oven without danger from said burners.

3. A gas stove comprising a top having an opening for burners, a top extension at the end of the opening, an oven in a vertical line above the extension to form a heat radiating space and a cover protection above the extension, a burner below the extension, and a flame and heat deflector between the burner and the said extension for the purpose described.

In testimony whereof I affix my signature in presence of two witnesses.

JOHN GRIFFITH HARVEY.

Witnesses:
ROBERT K. CLARK,
A. F. MILLIKAN.